July 22, 1941.  W. WADE  2,250,430
PROCESS AND APPARATUS FOR FORMING TUBING
Filed June 8, 1935   3 Sheets-Sheet 1
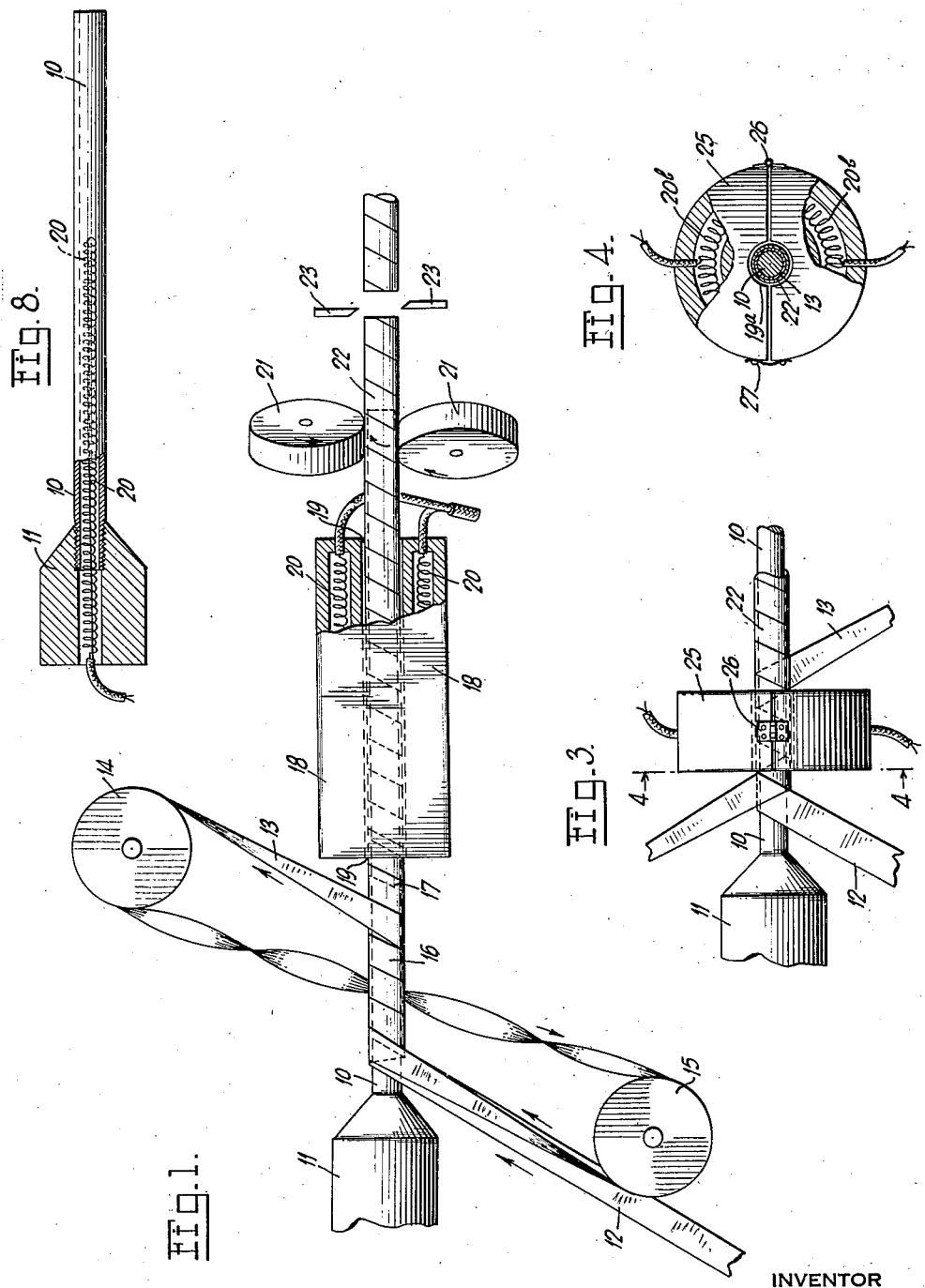
INVENTOR
BY Worth Wade
ATTORNEY July 22, 1941.  W. WADE  2,250,430
PROCESS AND APPARATUS FOR FORMING TUBING
Filed June 8, 1935  3 Sheets-Sheet 2
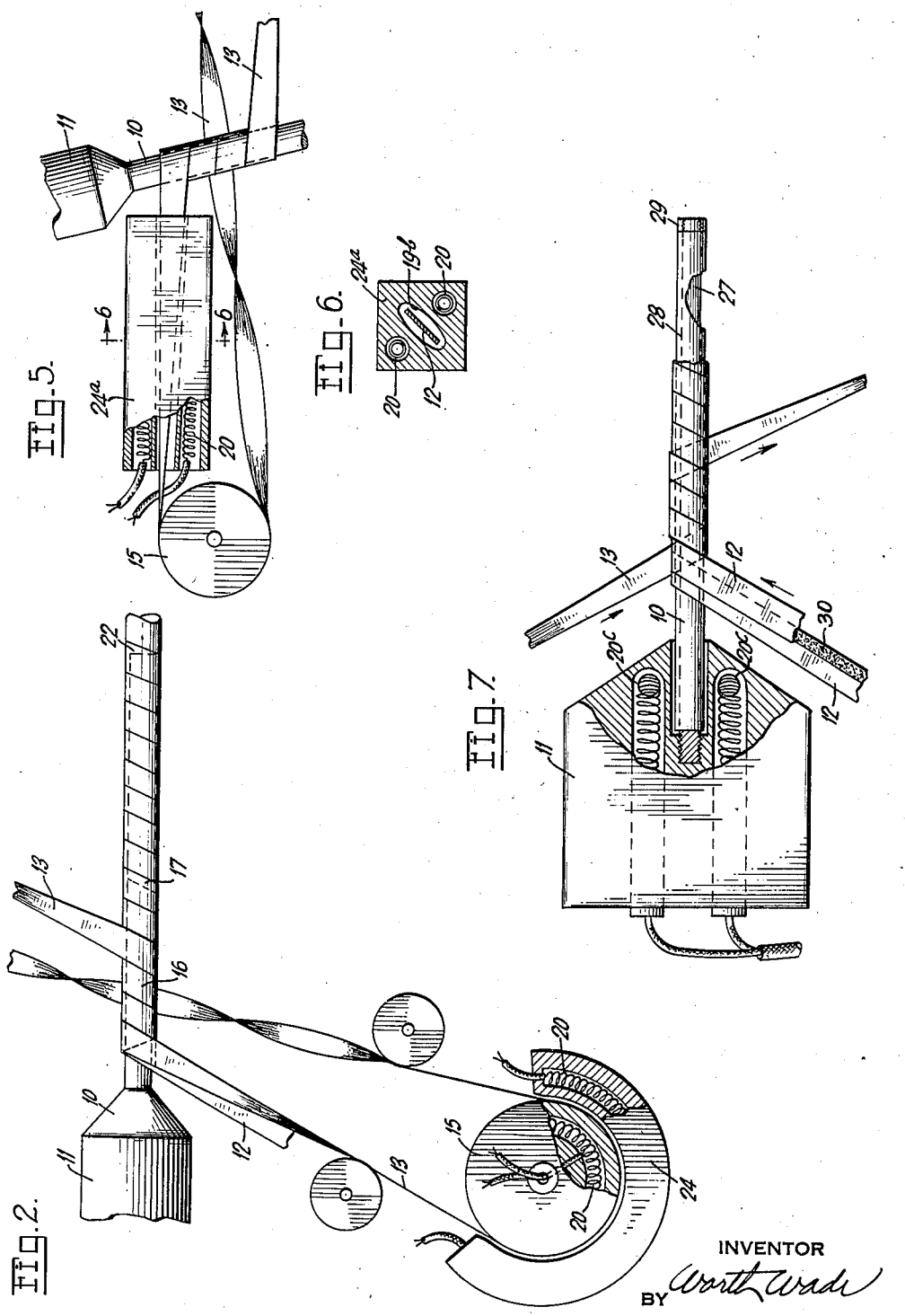
INVENTOR
Worth Wade
BY
ATTORNEY July 22, 1941.   W. WADE   2,250,430
PROCESS AND APPARATUS FOR FORMING TUBING
Filed June 8, 1935    3 Sheets-Sheet 3

INVENTOR
Worth Wade
BY
ATTORNEY

Patented July 22, 1941

2,250,430

UNITED STATES PATENT OFFICE 2,250,430

PROCESS AND APPARATUS FOR FORMING TUBING

Worth Wade, New York, N. Y., assignor to Sylvania Industrial Corporation, Fredericksburg, Va., a corporation of Virginia Application June 8, 1935, Serial No. 25,599

11 Claims. (Cl. 93—80)

This invention relates in general to tubing formed by helically winding a strip of material on a mandrel and, in particular, to an improved process and apparatus for forming such tubing adapted for use as a drinking straw.

In the manufacture of tubing by spirally winding strips of non-fibrous, homogeneous material such, for example, as regenerated cellulose, it has been observed that the inherent resilience and stiffness of the material tend to cause the strip to unwind after the formation of the tubing. This disadvantage cannot be completely overcome even by sealing the overlapping portions of the strip with adhesive because the non-fibrous material is characterized by having a smooth surface which affords little anchorage for the adhesive. The use of an adhesive, moreover, decreases the speed of production because time must be allowed for the adhesive to attack the surface of the material and to dry between the layers.

It is a general object of this invention to provide a process for forming tubing by helically winding a strip of material on a mandrel in a manner such that the strip of material is prevented from unwinding so that the tubing may be formed at a high speed.

It is another object of the invention to provide an apparatus for forming tubing by helically winding a strip of material on a mandrel in which means are provided for sealing the overlapping portions in a manner such as to prevent the strip from unwinding.

It is a specific object of the invention to provide a process and apparatus for pretreating the tube-forming material in such a manner as to render the material more plastic and less resilient and to decrease its stiffness in order to prevent the unwinding of the strip of material in the finished tubing.

Other objects of the invention will in part be obvious and will in part appear hereinafter.

According to the invention, there is provided in an apparatus for forming tubing, the combination of a mandrel which is preferably rotated and/or heated, means for helically winding a strip of heat-sealable material about the mandrel into a tubing having spiral overlapping portions, means to apply heat to the strip to render it tacky, the heat being applied either before, during or after the winding operation and means to apply pressure to the strip while it is tacky and while the tubing is supported on the mandrel to seal the overlapping portions, the pressure being applied preferably simultaneously with the application of heat.

According to the process of the invention, a strip of heat-sealable material is helically wound about a mandrel into a tubing having spiral overlapping portions and the overlapping portions sealed by the application of heat and pressure while the tubing is supported on the mandrel. If desired, the strip may be pretreated to impart thereto a tendency to form a spiral coil and the strip then wound in the direction of the spiral so as to produce a tubing which is free from a tendency to unwind. The strip may also be heated and/or treated with a solvent or softening agent prior to being wound into a tubing, these treatments serving to render the material more tacky.

The invention accordingly comprises a process having the steps and the relation of steps one to another and an apparatus having the features, elements and the relation of elements one to another all as described and set forth in the following detailed description and the scope of the application of which may be indicated in the claims.

For a more complete understanding of the nature and objects of the invention, reference should be had to the attached drawings in which:

Fig. 1 represents a top plan view of one embodiment of the apparatus of the invention;

Fig. 2 is a fragmentary view of the apparatus showing one embodiment of means for heating the winding belt;

Fig. 3 is a fragmentary view of the apparatus showing a second embodiment of the means for heating the winding belt;

Fig. 4 is an end elevation, partly in section, of the heating chamber of the apparatus of Fig. 3, taken along the line 4—4 thereof;

Fig. 5 is a fragmentary view of the apparatus showing a further embodiment of means for heating the winding belt;

Fig. 6 is a side elevation, partly in section, of the heating chamber of Fig. 5 taken along the line 6—6 thereof;

Fig. 7 is a top plan view, partly in section, of that one embodiment of the apparatus in which the mandrel is heated;

Fig. 8 is a view, partly in section, of a second embodiment of means for heating the mandrel of the tube-forming apparatus;

Figure 11:
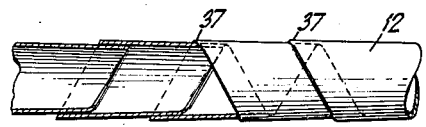
Figure 12:
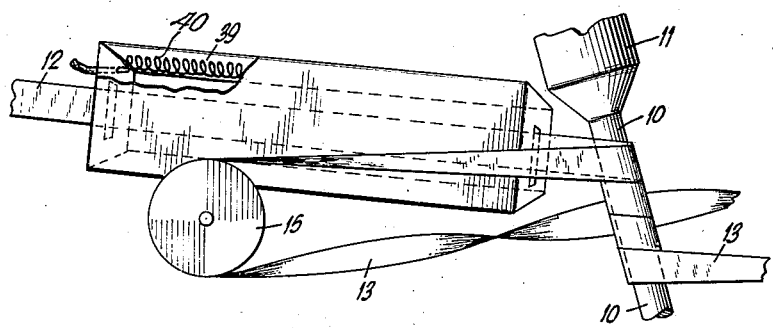

Fig. 11 is a view, partly in section, of the tubing formed in accordance with one embodiment of the process; and Fig. 12 is a top view of a simple apparatus for pretreating the material before forming it into a tubing Referring now to Fig. 1, the apparatus of the invention comprises, in general, a cylindrical mandrel 10 integral with or fixed in a suitable base 11. A suitable strip of material 12 is wound about the mandrel 10 helically and continuously by means of a winding belt 13 which is moved continuously through a closed path by passing it first around the driven roller 14, then under the mandrel 10, next around the roller 15 and then spirally about the mandrel 10 to form over the strip a spiral coil 16 as shown in Fig. 1. The motion of the belt in the direction of the arrows will cause the strip 12 to wind on the mandrel in a spiral form. The angle with which the edge of the strip 12 makes with respect to the mandrel 10 is so adjusted that the strip will overlap the preceding convolution of the strip, thus forming a lap joint 17.

The apparatus comprises means for heating the overlapping portions of the strip of material. One embodiment of this heating means is shown in Fig. 1 in which there is provided a heating chamber 18 having a bore 19 through which the mandrel 10 passes. The chamber 18 may be heated by any suitable means such, for example, as electrically heated coils 20 disposed therein. The bore 19 is of such diameter that the chamber surrounds closely the enclosed spirally wound tubing, but does not contact it.

The apparatus also comprises means for applying pressure to the overlapping portions of the strip while the material is still tacky as a result of being heated. The pressure may be applied, for example, by means of one or more pressure rollers 21 set at a slight angle to the tubing and positioned to rotate in pressing contact with the surface of the spirally wound tubing 22. The pressure rollers 21 are positioned at a point so close to the end of the heating chamber that the strip will be pressed by the rollers before the material has cooled below a sealing temperature. The mandrel 10 has a length such that it extends between the rollers 21 and thus supports the tubing when pressure is applied thereto.

The finished tubing passing from the mandrel may be cut into suitable sections by known means such, for example, as reciprocating cutters indicated diagrammatically at 23. Any suitable means may be used to drive the several rollers and reciprocate the cutters of the apparatus.

According to one embodiment of the process, heat and pressure are applied to the overlapping portions during the formation of the tubing and simultaneously with the winding of the strip by the use of the chamber surrounding the mandrel. As shown in Fig. 2, the apparatus may comprise a winding belt 13 formed of heat-conducting materials such as a metal band which may be heated in any suitable manner. In that embodiment of the apparatus shown in Fig. 2, the idling roller 15 is provided with a heating coil embedded therein, the electrical connections to an external source being made through the axle of the roller in a known manner. If desired, there may be disposed about the idling roller 15, a concentric chamber 24 having an electric heating coil 20 disposed so as to heat the belt 13 by convection as it passes around the roller 15.

There is shown in Figs. 3 and 4 a further embodiment of means for heating the winding belt. In this case, there is provided a chamber 25 adapted to encircle the mandrel 10 at the point where the band forms a spiral coil 16 around the mandrel as shown in Fig. 3. To facilitate repairs to the mandrel 10 and/or winding belt 13, the chamber may be bipartite and adapted to be removed by separating the parts. For example, the chamber may be formed in two halves which are joined on the one side by a hinge 26 and on the other side by a spring clip 27. The chamber 25 may be heated by suitable electric coils 20b disposed therein.

With the apparatus shown in the several Figs. 2 to 6, the winding belt is constantly maintained at a sealing temperature, in consequence of which the strip 12 is wound and sealed simultaneously when contacting the belt coil 16. An auxiliary heating chamber such as that shown in Fig. 1 may be used in conjunction with the heated belt of the invention.

Alternatively, as shown in Figs. 5 and 6, the winding belt 13 may be heated by passing it through a chamber 24a having a slit-shaped bore 19b through which the belt 13 may be passed. Such a chamber may be disposed between the roller 15 and the mandrel 10 to heat the belt by convection just prior to its contact with the tube-forming strip 12.

In one embodiment of the apparatus, the invention contemplates the use of a heated mandrel. As shown in Fig. 7, the mandrel 10 may be set into a supporting block 11 which is heated by the electric coils 20c embedded therein, whereby the mandrel is maintained at a sealing temperature. Alternatively, as shown in Fig. 8, the mandrel may be formed of a hollow cylinder having a heating coil 20 passing through the center of the mandrel to heat the same to a sealing temperature.

Where the mandrel is heated, some difficulty may arise from the tendency of the strip of tube-forming material to stick to the mandrel. This may be overcome by providing a freely rotatable mandrel. For example, the mandrel may comprise a rod 27 having one end threaded and set into the block 11 and a hollow cylinder 28 adapted to rotate freely about the rod 27, the cylinder being maintained in position by a nut 29 threaded to the free end of the rod 27. With this embodiment of the mandrel, the cylinder 28 tends to rotate during the winding of the strip thereon and this facilitates the even and continuous formation of the tubing.

In the embodiments of the apparatus shown in Figs. 1, 2, 3 and 5 wherein the mandrel is not heated, it is preferable to form the mandrel of a material having a low thermal conductivity such, for example, as porcelain, glass, synthetic molding resin, etc. Such materials may be strengthened by being provided with a metal core.

The strip 12 from which the tubing is formed may comprise any suitable sheet or film such as paper or the like but, in the preferred embodiment of the process, the material consists of non-fibrous material such, for example, as regenerated cellulose, cellulose esters, cellulose ethers, cellulose oxy-ethers, cellulose ether esters, gelatine, casein and synthetic resins in sheet form. These materials preferably are formed in whole or in part and/or combined with a heat-fusible material. The expression "heat-sealable" used in the description and claims is intended to apply to material which is inherently heat-fusible, i. e. a material such as cellulose acetate, as well as material which is rendered heat-sealable by reason of being treated with an adhesive solvent and/or softening agent or which has been coated with a heat-fusible composition. The material also may be impregnated or combined as by coating with a suitable waterproof composition such, for example, as wax or a wax-containing lacquer.

The strip may have indicia applied thereon and may be decorated, embossed, dyed or printed before or after being formed into the tubing. Likewise two or more strips, as shown in Fig. 7, may be wound simultaneously to form a single tubing, in which case the overlapping portions may be sealed by the use of an adhesive 30 and/or a solvent for the sheet material or its coating. Moreover, the tubing may be formed of colored strips or of two or more strips of different colors, or of a plurality of strips, one of which is opaque and one of which is transparent.

Figure 9:
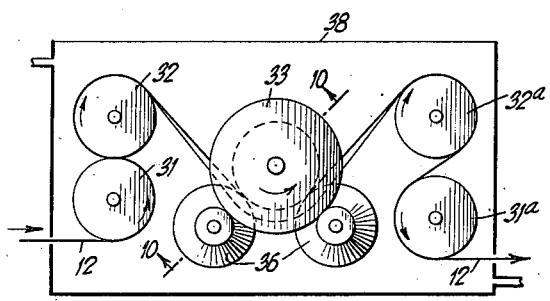
Fig. 9 is a side elevation of one embodiment of an apparatus for pretreating the material used in forming the tubing in accordance with the process of the invention.
Figure 10:
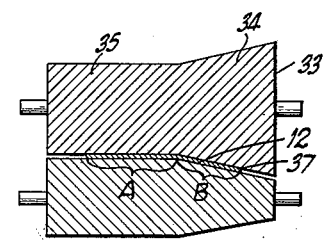
Fig. 10 is a sectional view of part of the apparatus of Fig. 9 taken along the line 10—10 thereof.

The tendency of the wound strip to unwind may be offset further by treating the strip prior to winding to produce an elongation of one side of the strip with respect to the other. For example, the strip may be caused to curl by preferentially shrinking one-half of the strip longitudinally and/or stretching the other half of the strip longitudinally. For example, there may be provided, in combination with the tube-forming apparatus, a device having means to continuously maintain a strip of material under tension and means located between the tensioning means to cause one edge of the strip to traverse a path greater than that of the other edge of the strip. One embodiment of a suitable apparatus is shown in Figs. 9 and 10 in which there is provided two pairs of rollers 31, 32 and 31a, 32a around which the strip is passed and which serve to maintain the strip under tension. There is positioned between these pairs of rollers a stretching roller 33 characterized by having an unequal diameter. The roller 33 comprises a conical portion 34 and a cylindrical portion 35. There may be provided one or more rollers 36 shaped so as to contact the roller 33 over both parts in order to prevent transverse displacement of the strip 12 as it contacts the roller 33. In operation, the strip 12 passes first around the idling rollers 31, 32, then under the stretching roller 33 and finally around the driven rollers 32a, 31a. It will be noted from Fig. 10, that the conical portion 34 of the roller 33 increases the path travelled by the strip between the rollers 32, 32a, as a result of which the strip is stretched longitudinally over the area B with respect to the area A. The rollers 31a, 32a are spaced slightly apart to avoid wrinkling the stretched strip.

As a result of the stretching operation above described, there is imparted to the strip a tendency to curl which greatly facilitates the formation of the strip into a helically wound tubing in which the convolutions do not tend to unwind. The stretched strip is fed to the winding mandrel 10 in such a manner that the stretched edge 37 will comprise the outer edge in the finished tubing as in Fig. 11. When the strip is wound in this manner, the various convolutions seat themselves snugly in the following convolutions so that the tubing is given a substantially permanent cylindrical form.

If desired, the apparatus for stretching may be enclosed in a chamber 38 and the strip, as it passes through the stretching apparatus, may be heated and/or subjected to the action of a softening or swelling agent for the purpose of increasing the plasticity of the material and to decrease its resilience and stiffness.

The invention further contemplates heating the strip of material just prior to the winding operation by passing the strip 12 through a heating chamber 39 heated by suitable means such as electrical coils 40, as shown in Fig. 12. In the chamber 39 the strip may be heated, thus rendering it relatively tacky, but not sufficient to fuse it or render it permanently tacky. The chamber 39 is positioned so close to the mandrel that the strip 12 is still in a heat-sealable condition as it passes under the winding belt 13. The strip may be heat-sealed as a result of the heat derived from the chamber 39 alone or in combination with a heated winding belt and/or a heated mandrel and/or a heating chamber encircling the mandrel, as in Fig. 1.

In all the embodiments of the apparatus shown in Figs. 2 to 7 inclusive and 12, the winding belt 13 serves as means for pressing the overlapping portions together while the material is in a heat-sealable condition.

It will thus be seen that by means of the present invention there have been provided a novel process and apparatus and since certain changes in carrying out the above process, and certain modifications in the apparatus which embody the invention may be made without departing from its scope, it is intended that all matter contained in the above description or shown in the accompanying drawings shall be interpreted as illustrative and not in a limiting sense.

I claim:

1. In an apparatus for making tubing, the combination of a mandrel, an endless heated metal band passing in a spiral about said mandrel for helically winding a strip of heat-sealable material about said mandrel into a tubing having spiral overlapping portions and means to apply heat and pressure to the tubing while on the mandrel to heat-seal the overlapping portions.

2. In an apparatus for making tubing, the combination of a mandrel, an endless metal band passing in a spiral about said mandrel for helically winding a strip of heat-sealable material into a tubing having spiral overlapping portions and means to heat the metal band, the band serving to apply heat and pressure to the tubing while on the mandrel to heat-seal the overlapping portions of the tubing.

3. In an apparatus for making tubing, the combination of a freely rotatable mandrel, means for helically winding a strip of heat-sealable material about said mandrel into a tubing having spiral overlapping portions and means to apply heat and pressure to the tubing while on the mandrel to heat-seal the overlapping portions.

4. In an apparatus for making tubing, the combination of a freely rotatable heated mandrel, means for helically winding a strip of heat-sealable material about said mandrel into a tubing having spiral overlapping portions and means to apply heat and pressure to the tubing while on the mandrel to heat-seal the overlapping portions.

5. In an apparatus for making tubing, the combination of a mandrel, means for pre-treating a strip of heat-sealable material to impart thereto a tendency to form a spiral coil, means for helically winding said treated strip following the direction of said spiral to form a tubing having spiral overlapping portions and means to apply heat and pressure to the tubing while on the mandrel to heat-seal the overlapping portions.

6. In an apparatus for making tubing, the combination of a mandrel, means for treating a strip of heat-sealable material to produce therein a variation in the length of one longitudinal edge over that of the other so that the strip tends to form a spiral coil, means for helically winding said treated strip following the direction of said spiral to form a tubing having spiral overlapping portions and means to apply heat and pressure to the tubing while on the mandrel to heat-seal the overlapping portions.

7. In a process for making tubing, the steps comprise pre-treating a strip of heat-sealable material to produce a tendency therein for the strip to form a spiral coil, helically winding said treated strip about a mandrel in the direction of said spiral to form a tubing having spiral overlapping portions and sealing the overlapping portions of the tubing by applying heat and pressure to the tubing while the tubing is supported on the mandrel.

8. In a process for making tubing, the steps comprise treating a strip of heat-sealable material to produce a variation in the length of one longitudinal edge over that of the other to produce in said strip a tendency to form a spiral coil, helically winding said treated strip about a mandrel in the direction of said spiral to form a tubing having spiral overlapping portions and sealing the overlapping portions of the tubing by applying heat and pressure to the tubing while the tubing is supported on the mandrel.

9. In an apparatus for making tubing, the combination of a mandrel, an endless metal band passing in a spiral about said mandrel for helically winding a strip of heat-sealable material about said mandrel into a tubing, and means for heating said metal band.

10. In an apparatus for making tubing, the combination of a mandrel, means for continuously helically winding on said mandrel a strip of heat-sealable material into a tubing having spiral overlapping portions, means to apply heat to the tubing on said mandrel comprising a heating chamber positioned over the winding means and surrounding the mandrel, said heating chamber being formed in two separable parts, and openable fastening means for maintaining the parts together but permitting separation of the parts to afford access to the interior.

11. In an apparatus for making tubing, the combination of a mandrel, means for pretreating a strip of material prior to forming it into a spiral to impart thereto a tendency to form a spiral coil, means for helically winding said strip following the direction of said spiral to form a tubing having spiral overlapping portions, and means for sealing together said overlapping portions of the tubing while on the mandrel.

WORTH WADE.